No. 716,828. Patented Dec. 23, 1902.
J. A. E. CRISWELL.
MACHINE FOR MAKING MATCHES.
(Application filed Sept. 28, 1901.)
(No Model.) 3 Sheets—Sheet 1.
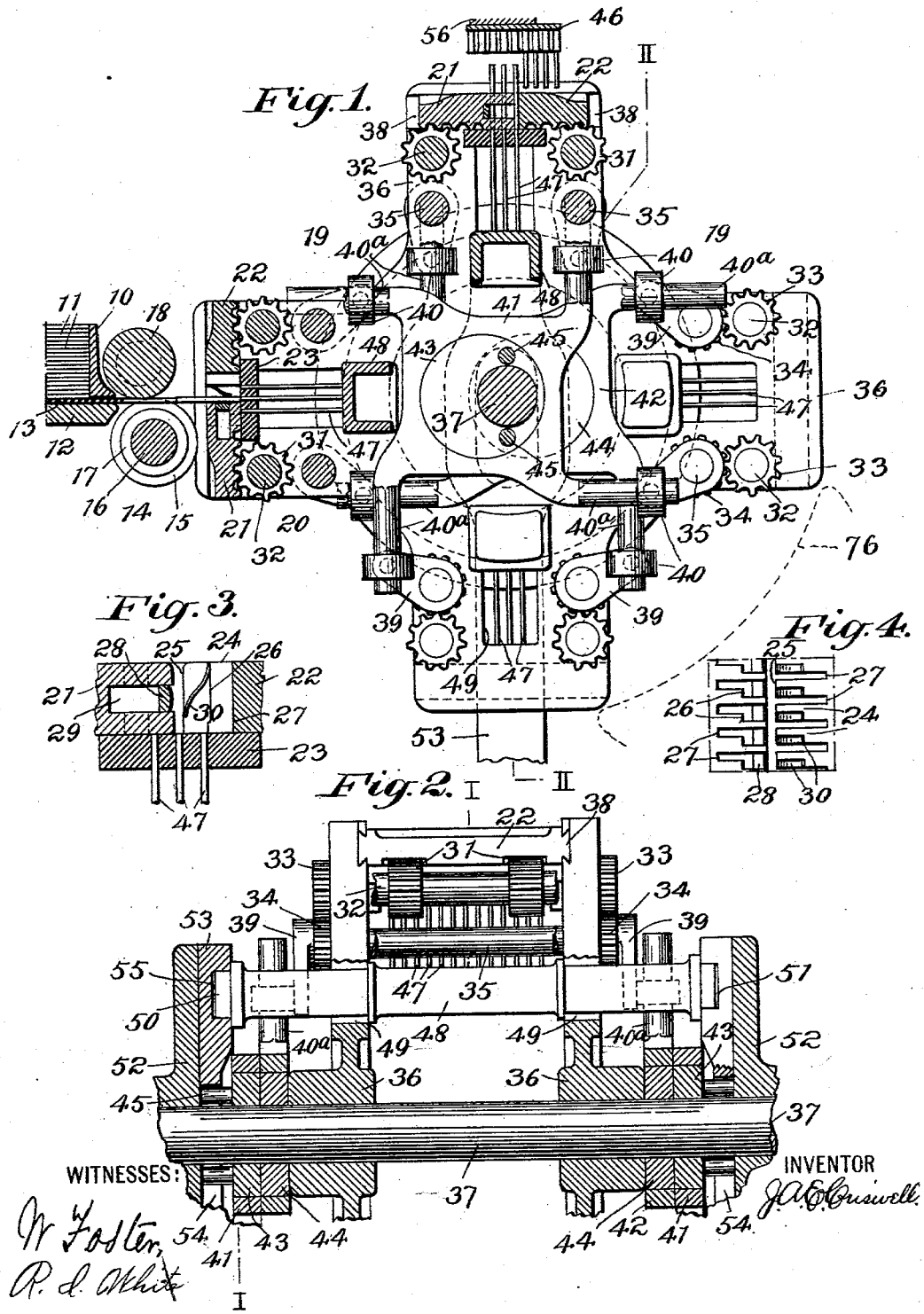
WITNESSES:
INVENTOR
J. A. E. Criswell No. 716,828. Patented Dec. 23, 1902.
J. A. E. CRISWELL.
MACHINE FOR MAKING MATCHES.
(Application filed Sept. 28, 1901.)
(No Model.) 3 Sheets—Sheet 2.
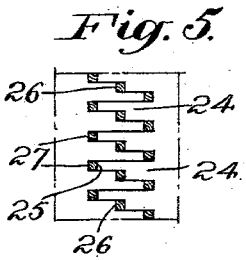
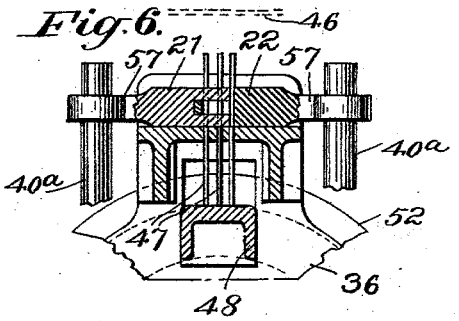
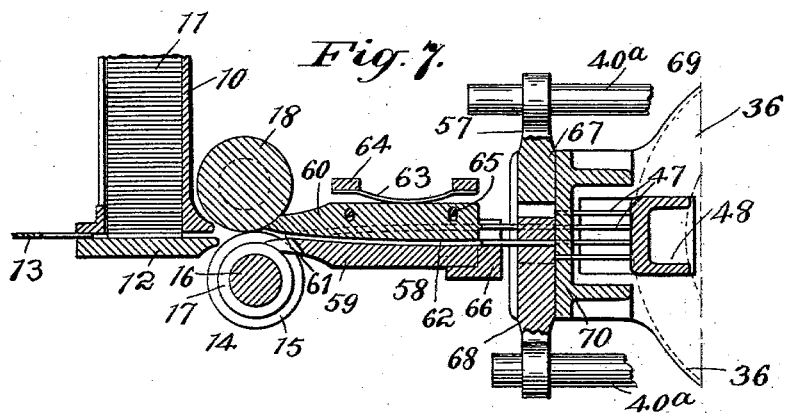
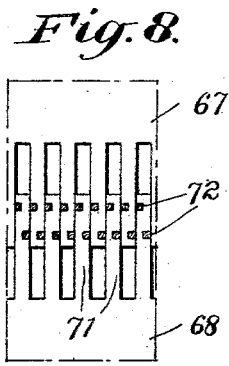
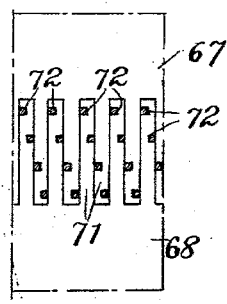
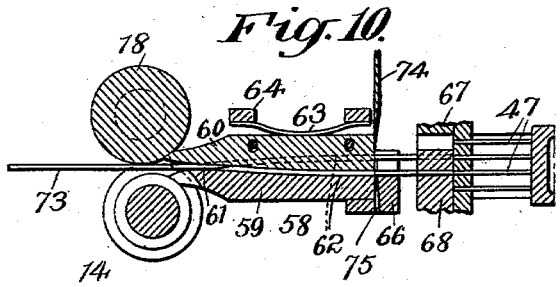
WITNESSES:
W Foster
R. L. White
INVENTOR
J. A. E. Criswell.

No. 716,828.  
J. A. E. CRISWELL.  
MACHINE FOR MAKING MATCHES.  
(Application filed Sept. 28, 1901.)

Patented Dec. 23, 1902.

(No Model.)

3 Sheets—Sheet 3.

WITNESSES:

INVENTOR

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,828, dated December 23, 1902.

Application filed September 28, 1901. Serial No. 76,872. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines such as are disclosed in my Patent No. 656,014, dated August 14, 1901, and my application, Serial No. 71,974, dated August 13, 1901, in which the splints are cut from veneer or sheetlike material.

The primary object of the invention is to provide simple and efficient means whereby a number of splints may be cut simultaneously from the material and the cut splints carried away from and clear of the cutting device and separated into independent rows, the independent rows of splints being forced by plunger means from the separating device into a suitable carrier to be held for completing the matches.

A further object of the invention is to provide a simple and efficient separator in which the splints may be received direct from the cutting means and carried bodily by a series of independent separators or sections that move in unison and the splints separated into a series of more than two independent rows, the separated rows being successively forced from the independent separators direct into a holding-carrier.

With these and other objects in view the invention consists in the construction and combination of the several parts, substantially as hereinafter described and then pointed out in the claims at the end of the description.

Figure 11:
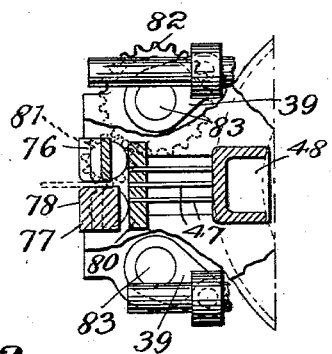
Figure 12:
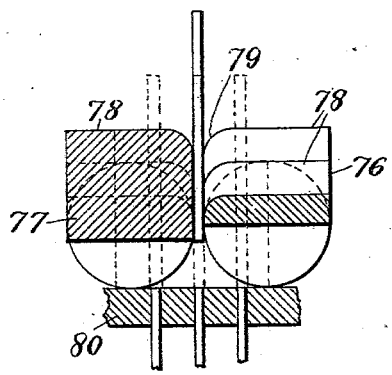
Figure 13:
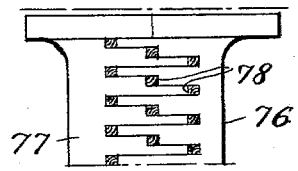
Figure 14:
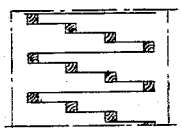

In the drawings, wherein similar figures of reference designate similar parts, Figure 1 is a fragmentary vertical section, partly in elevation, of one form of machine embodying my invention, the section being taken on the line I I of Fig. 2. Fig. 2 is a vertical section, partly in elevation, taken on the line II II of Fig. 1. Fig. 3 is an enlarged fragmentary section taken through the separator members before the latter are moved to separate the splints. Fig. 4 is a fragmentary plan view of the members in the position shown in Fig. 3.
Fig. 5 is a fragmentary plan view showing the position of the members after the splints have been separated into independent rows. Fig. 6 is a view of a separator of substantially the form shown in Figs. 1 and 2, except that the members are operated direct from the eccentric-block arms instead of being operated by gears. Fig. 7 is a fragmentary vertical section showing how the splints may be initially separated and then further separated. Fig.
8 is a fragmentary plan view of the members for further separating the splints shown in Fig. 7. Fig. 9 is a fragmentary view showing the position of the members of Figs. 7 and 8 after the members are forced toward each other to further separate the splints. Fig. 10 is a fragmentary sectional view showing how long strips or sheets of material may be cut into splint strips or long splints, the long splints separated into independent rows, and the separated splints cut by a second cutting device into short or complete splints, the short or complete splints being then further separated. Fig. 11 shows how swinging members instead of sliding members may be employed to separate the splints, there being plungers, as in the other views, for forcing the splints from the separator members. Fig. 12 is an enlarged sectional view through the separator members shown in Fig. 11. Fig. 13 is a fragmentary plan view of the separator members, and Fig. 14 is a fragmentary plan showing how the splints are arranged when separated into four instead of three independent rows.

No particular claim is made in this application either to the cutting mechanism or to the means for getting the splints to the separator nor to the means for holding the splints after the latter are separated, as these features may be in accordance with what is disclosed in my patent or the application hereinbefore referred to or such as is old and commonly used in the art.

The hopper 10, as well as other operative parts of the machine, may be supported upon a suitable frame, and in the hopper 10 may be arranged cards or blanks of veneer 11. These cards or blanks are normally forced downward upon a bed-plate 12 and by a plunger 13 are successively forced to a cutting device 14. This cutting device 14 comprises a series of circular cutters 15, arranged upon a spindle or shaft 16 and spaced apart the width of the splints by the washers 17, and said cutters cut the splints against a backing-roll 18. The splints as they are cut are forced by the cutters either in conjunction with or independent of the plunger device 13 to a separator 19. The cutting and forcing of the splints to the separator is substantially the same as disclosed in my patent and may be of any suitable form or construction.

To separate the splints, various means may be employed. As shown, the separator 19 comprises a series of four independent sections 20, each in themselves an independent separator, though it will be understood that the number of independent sections may vary. Each section 20 comprises two movable and slidable members 21 and 22, that are adapted to move over and along a bed-plate 23. These members have fingers or devices 24, that are adapted to intermesh and move toward each other, and said fingers provide abutments 25, 26, and 27 for the splints. The member 21 has a transverse bar 28 secured thereto, that forms a backing for the splints, and said bar is adapted to move in a slot or groove 29 in the member 21 of each section or separator. The member 22 has a series of springs 30, that are adapted to hold every third splint or one set of splints normally against the rod or transverse bar 28 in substantially the same manner as described in my application already referred to. The members 21 and 22 are provided with teeth on their inner surfaces that mesh with gears 31 on the shafts 32, so that when the latter are rotated in the proper direction the said members 21 and 22 will be forced toward each other. During this movement one set of splints held by the abutments 25 of the longest fingers and the transverse bar 28 will be carried against abutments 27 of the member 22. A second set will be held between the transverse bar 28 of the member 21 and the springs 30 of the member 22. A third set will be free to move in one direction only, and that is toward the abutments 27 of the member 22, the members thus separating the splints into three independent and parallel rows. The shafts 32 for operating the members are provided with gears 31, that engage teeth on the inner surface of the members 21 and 22 and have gears 33 on their outer ends that mesh with gears 34, carried by the shafts 35. The shafts 32 and 35 are properly journaled in the wheels or spiders 36, the latter being rigidly secured to the shaft 37. The members 21 and 22 are slidingly held in grooves 38 in the wheels 36, so as to be readily movable therein when the shafts 35 are operated to rotate the gears 31 for moving the members. On the outer ends of the shafts 35 are cranks or arms 39. These cranks or arms are pivotally held to collars or sleeves 40, that are adapted to slide on and move with the arms 40$^a$ of the eccentric-blocks 41 and 42. The eccentric-blocks 41 and 42 are similarly constructed, and the arms 40$^a$ thereof are staggered and arranged at right angles with respect to each other. The arms 40$^a$ of the eccentric-block 41 are oppositely arranged with respect to the arms 40$^a$ of the eccentric-block 42 and are positioned so as to extend on opposite sides of the sections or separators 20 in order that the arms of one eccentric-block will operate one member of each section, while the arms of the other eccentric-block will operate the other member of each section. The block 41 is adapted to move around a fixed eccentric 43, while the block 42 is adapted to move around an oppositely-arranged fixed eccentric 44. The fixed eccentrics 43 and 44 are held to the frame or other stationary portion of the machine, as by the rods 45, so that when the eccentric-blocks 41 and 42 move around said eccentrics and while the separator-sections are carried from a horizontal to a vertical position the uppermost arms of the eccentric-blocks will be forced toward each other, and by the latter through the gears 34 and 33 and gears 31 on the shafts 32 will force the members 21 and 22 toward each other to separate the splints. By this means the splints are carried bodily away from the cutting means or splint-supplying means and separated into independent rows in position to be discharged into suitable holding means or a carrier, as 46.

As means for forcing the splints from the separator members into the carrier or other holding means a series of plungers 47 is provided. There is a plunger for each splint, and said plungers are guided at one end in the bed or plate 23 and at their other ends are held to a slide or head 48, the number of slides or heads corresponding to the number of separator-sections. The slides 48 are adapted to move radially in slots 49 in the wheels 36 and extend outward beyond the wheels and have their ends 50 normally adapted to ride in annular grooves 51 in stationary flanges or disks 52. These stationary flanges or disks have vertical slots or grooves in which the bars 53 are adapted to reciprocate. The bars 53 are provided with slots 54, by which the said bars are adapted to span the shaft 37, and the upper ends of said bars are provided with transverse grooves 55, that are adapted normally to register with the annular grooves 51 of the stationary flanges or disks 52. During the movement of the separator-sections from a horizontal to a vertical position the uppermost slide will ride from the annular grooves 51 of the stationary flanges or disks into the transverse grooves 55 of the bars 53 and will be held by said bars. At this time a reciprocatory movement by any suitable mechanism is imparted to the bars, which will force the uppermost slide upward, so as to force the splints from between the separator members into the holding devices of the carrier 46, an abutment-plate or other means 56 being provided to take the thrust of the splints as the latter are forced into the holding devices of the carrier. The form of carrier may be of the usual or of any preferred construction and may be operated in any suitable manner and for operating the shaft to successively present the separator-sections in position to receive the splints and to force the separated splints from the sections to the carrier mechanism substantially as described in my application heretofore referred to may be employed.

In Fig. 6 the members 21 and 22 have projecting arms 57, that are adapted to fit over and slide direct upon the arms 40ª of the eccentric-blocks 41 and 42 instead of the arms 40, operating the members through the gears, as shown in the other views, the construction being otherwise the same as that shown in Figs. 1 and 2.

The cards 11 in the hopper 10 of Fig. 7 are fed to the cutting device 14 and cut into splints in substantially the same manner as already described, and instead of being directly fed to the separator-sections they are fed or forced to initial separating means 58. This initial separating means is fixed to a suitable portion of the frame and comprises two members 59 and 60. These members provide a single way, pass, or opening 61 and independent rows of independent diverging channels 62, that extend at right angles to the plane of the single way or pass and form a continuation thereof. The members 60, as well as the member 59, may comprise a single piece or may be made up of separate and independent plates. The member 60 may be yieldingly forced toward the member 59 by means of the springs 63. The springs 63 are properly held to the cross-bars 64 and normally yieldingly hold the said members of the initial separating means in such a manner that the said members will yield sufficiently in case material of a different size is forced therethrough, the said member 60 being suitably guided on the bars or rods 65 and the whole being constructed and arranged in substantially the same manner as disclosed in my application, Serial No. 54,618, dated April 6, 1901. The splints as they are forced from the initial separating means 58 are guided by means of a bar 66 and held between the members 67 and 68 of the further separating means 69. The members 67 and 68 are slidingly held in the wheels 36, as in the other views, and normally rest and slide over a bracket and bed-plate 70. The members 67 and 68 have intermeshing devices 71, each of which is provided with two individual receivers 72, and each device 71 is adapted to receive and hold a single splint of each row as they are forced from the initial separating means 58. As the separator-section is carried around the members 67 will be forced toward each other from the position shown in Fig. 8 to the position shown in Fig. 9, so as to divide the splints into four independent and parallel rows, the said members being operated in substantially the same manner as already described. The separated splints are forced from the members by means of the plungers 47, as in the other views, so as to be held by a suitable carrier or other holding means.

In Fig. 10 the construction is substantially the same as in Fig. 7, except that long blanks or strips of sheet-like material or veneer 73 are fed to the cutting device 14 and by the latter cut into long splints or splint strips. The splint strips are separated by the devices 58 into independent rows and while held by the separator members 67 and 68 will be cut transversely into complete splints by a reciprocatory or other knife 74. This knife is adapted to work across the face of the initial separating means 58, a slot 75 for the edge of the knife being provided in the guide-bar 66. The complete splints are further separated and forced into the carrier, as hereinbefore referred to.

Fig. 11 shows how the splints may be separated by swinging members instead of sliding members. The members 76 and 77 are constructed and operated in substantially the same manner as described in my application, Serial No. 74,348, filed September 5, 1901. The members 76 and 77 are provided with splint-engaging devices or ribs 78 along their faces and are rounded, as at 79, so as to be gradually developed. When the members are swung toward each other on their pivots, they will carry the row of splints inward against a plate 80 and will separate the splints into a series of independent and parallel rows, as shown in dotted lines in Fig. 12 and in full lines in plan in Fig. 13. The studs or shanks of the members 76 and 77 are provided with gears 81, that mesh with larger gears 82 on the shafts 83. These shafts are operated by means of arms or cranks in substantially the same manner as described in the said application. The splints after being carried away from the cutting means and separated are forced by the plungers 47 into suitable holding means in substantially the manner shown in Figs. 1 and 2.

Fig. 14 shows how the members of any of the forms shown may divide the splints into four instead of three independent rows.

From the foregoing it will be seen that simple and efficient means is provided whereby splints may be carried bodily by circularly-moving means and independent sections away from the source of supply and properly separated into independent rows and the independent rows of splints positively forced by plungers into a suitable carrier.

Although in the form of machine shown the splints are supplied to the separator in a horizontal plane and by the latter carried away from the splint-supplying means and then forced into a carrier that travels over and above the separator, it will be understood that the relative arrangement of the parts may vary as desired—as, for example, the splints may be fed by the cutting device in a vertical plane instead of horizontally, and the carrier may be made to travel vertically to receive the splints instead of in the manner shown.

By the term "veneer" it will be understood that wood veneer or any material from which splints may be made is included, and while a particular kind of splints is shown the latter may be of any suitable shape, according to the various means that may be employed for producing them.

Additional means besides the plungers might be employed for removing fiber, dust, and the like from the sections. One means is shown in dotted lines in Fig. 1. A chute 76, having a flared mouth, is arranged in the path of movement of the sections, and this chute is connected to an exhaust-fan or other means to subject the sections to the action of air during their movement.

In this application I do not claim, broadly, the feature of carrying the splints bodily and separating them into independent rows, nor broadly to carrying separated rows of splints away from the cutting mechanism or source of supply and forcing them into dipping frames or carriers, as such is claimed in my application, Serial No. 737,186, filed November 16, 1899. I also do not claim, broadly, a separator comprising one or more independent sections that force the splints into a dipping-carrier by plungers or otherwise, as such is claimed in my applications, Serial No. 45,044, filed January 28, 1901, Serial No. 71,974, filed August 13, 1901, and Serial No. 74,710, filed September 10, 1901.

Instead of the members of the sections being both movable they may be relatively fixed and movable. In this case the operating mechanism of one of the members of each section will be dispensed with.

Having thus described my invention, what I claim as new, and desire to secure by Letters Patent, is—

1. In a match-making machine, the combination with means for supplying splints, of a series of movable and independent sections each provided with members having fixed devices or fingers that are adapted to intermesh and which separate the splints into independent rows, a dipping-carrier, and plungers for forcing the splints from the sections into the carrier.

2. In match-making machinery, the combination of a series of circularly-moving and independent sections each provided with two members having fixed fingers or devices that are adapted to intermesh and which move the splints bodily at once, a dipping-carrier, and plungers for forcing the splints from the sections into the carrier.

3. In match-making machinery, the combination with splint-cutting means, of a separator having a series of intermittently circularly moving independent sections, each provided with two movable members having gradually-developed splint-engaging devices adapted to intermesh and receiving in succession a row or line of splints, and carrying the row bodily at once away from and clear of the cutting means, means for actuating the members to separate the splints, dipping means for the splints, and plungers for forcing the splints from the separator-sections into the dipping means.

4. In a match-making machine, the combination with splint-cutting means, of a separator having a series of intermittently circularly moving independent sections each having two members provided with fixed fingers or devices that are adapted to intermesh and which receive in succession a row or line of splints and carry such row bodily at once away from and clear of the cutting means, means for moving the members toward each other to separate the splints into more than two independent rows in right lines and at right angles to the plane in which they are received, holding means for the splints, together with plungers for forcing the splints from the separator-sections into the holding means.

5. In match-making machinery, the combination with splint-cutting means, of a movable separator having a series of independent sections each provided with two pivotal members that open and close with a book-like action, and which receive the splints endwise in succession while open, a carrier, and plungers for forcing the splints from the sections into the carrier.

6. In match-making machinery, the combination with means for supplying splints, of a circularly-movable device comprising two pivotal members that receive the splints endwise and separate them into independent rows, means for delivering the splints endwise to the device, a dipping-carrier, and plungers for forcing the splints from the sections into the dipping-carrier.

7. In a match-making machine, the combination with means for supplying splints, of a series of movable and independent sections, each provided with two pivotal and swinging members which separate the splints into independent rows, holding means for the splints, and plungers for forcing the splints from the sections to the holding means.

8. In a machine for making matches, the combination of a movable and independent device having two swinging members for separating the splints into independent rows, said members being provided with fixed splint-engaging devices along their faces adapted to intermesh and which also open and close with a book-like action, means for swinging the members toward each other to separate the splints, a carrier, and plungers for forcing the splints from the section into the carrier.

9. In match-making machinery, the combination with means for supplying splints, of a series of movable and independent sections each provided with two movable members and moving the splints bodily at once, said members opening and closing with a book-like action, and receiving the splints endwise while open and which separate the splints when closed, means for operating the members to separate the splints, a dipping-carrier, and plungers for forcing the splints from between the members of the sections to the carrier.

J. A. EKIN CRISWELL.

Witnesses:
W. FOSTER,
R. I. WHITE.